United States Patent
West

(10) Patent No.: US 7,959,991 B1
(45) Date of Patent: Jun. 14, 2011

(54) METHOD OF MANUFACTURING AN ARTIFICIAL STONE MATERIAL

(76) Inventor: Albert C West, Southbridge, MA (US)

( * ) Notice: Subject to any disclaimer, the term of this patent is extended or adjusted under 35 U.S.C. 154(b) by 269 days.

(21) Appl. No.: 11/689,102

(22) Filed: Mar. 21, 2007

Related U.S. Application Data

(63) Continuation-in-part of application No. 10/611,581, filed on Jun. 30, 2003, now Pat. No. 7,198,833.

(51) Int. Cl.
B44F 9/00 (2006.01)
(52) U.S. Cl. ............. 428/15; 428/318.4; 428/310.5; 428/313.5; 428/313.9; 428/317.9; 52/747.12; 52/745.19
(58) Field of Classification Search ........... 52/745.19, 52/746.1, 747.12; 428/15, 304.4, 310.5, 428/313.3, 313.5, 313.9, 317.9, 318.4, 319.3
See application file for complete search history.

(56) References Cited

U.S. PATENT DOCUMENTS

| | | | |
|---|---|---|---|
| 3,050,785 A * | 8/1962 | Cunningham | 264/246 |
| 3,209,500 A * | 10/1965 | Bernett | 52/309.3 |
| 3,230,184 A * | 1/1966 | Alford | 523/219 |
| 3,488,246 A * | 1/1970 | Duggins | 428/15 |
| 3,562,379 A * | 2/1971 | Duggins | 64/173.18 |
| 3,873,475 A * | 3/1975 | Pechacek et al. | 523/509 |
| 4,053,448 A * | 10/1977 | Holle | 523/219 |
| 4,076,767 A * | 2/1978 | Samejima | 525/41 |
| 4,188,316 A * | 2/1980 | Sawada | 524/779 |
| 4,216,136 A * | 8/1980 | Stayner | 524/405 |
| 4,433,070 A * | 2/1984 | Ross et al. | 523/171 |
| 4,446,177 A * | 5/1984 | Munoz et al. | 428/15 |
| 4,734,302 A * | 3/1988 | Baskin | 428/15 |
| 4,818,570 A * | 4/1989 | Milles | 427/273 |
| 4,839,394 A * | 6/1989 | Champion | 521/55 |
| 4,849,456 A * | 7/1989 | Champion | 521/54 |
| 4,956,030 A * | 9/1990 | Baskin | 156/61 |
| 4,966,794 A * | 10/1990 | Hasegawa et al. | 428/15 |
| 5,043,377 A * | 8/1991 | Nogi et al. | 524/437 |
| 5,055,324 A * | 10/1991 | Stecker | 427/281 |
| 5,112,657 A * | 5/1992 | Melber | 428/15 |
| 5,166,230 A * | 11/1992 | Stecker | 523/500 |
| 5,244,941 A * | 9/1993 | Bruckbauer et al. | 523/171 |
| 5,248,466 A * | 9/1993 | Russell, III | 264/72 |
| 5,275,852 A * | 1/1994 | Jones et al. | 428/15 |
| 5,281,633 A * | 1/1994 | Okuno et al. | 523/513 |
| 5,304,592 A * | 4/1994 | Ghahary | 524/437 |
| 5,318,853 A * | 6/1994 | Bayha et al. | 428/431 |
| 5,364,672 A * | 11/1994 | Schultze-Kraft | 428/15 |
| 5,391,665 A * | 2/1995 | Matsunaga et al. | 526/211 |
| 5,422,391 A * | 6/1995 | Inoue | 524/427 |
| 5,476,895 A * | 12/1995 | Ghahary | 524/437 |
| 5,576,108 A * | 11/1996 | Neumann et al. | 428/413 |
| 5,578,685 A * | 11/1996 | Neumann et al. | 525/481 |
| 5,609,680 A * | 3/1997 | Kobayashi et al. | 106/696 |
| 5,624,510 A * | 4/1997 | Uchida et al. | 156/62.2 |
| 5,648,144 A * | 7/1997 | Maurer et al. | 428/141 |
| 5,735,094 A * | 4/1998 | Zember | 52/314 |

(Continued)

*Primary Examiner* — Eileen Lillis
*Assistant Examiner* — James Ference
(74) *Attorney, Agent, or Firm* — Alix, Yale & Ristas LLP

(57) ABSTRACT

An artificial stone material having an improved natural stone appearance and texture is prepared from resin, curing agent, microspheres and additives. The resin, curing agent and microspheres are mixed to form a catalyzed base material. Additives are non-homogeneously worked into the catalyzed base material to provide a catalyzed stone mixture having a desired natural stone appearance. The catalyzed stone mixture is molded or applied to a surface at the point of use and allowed to cure to form the artificial stone material.

20 Claims, 1 Drawing Sheet

U.S. PATENT DOCUMENTS

Figure 1:
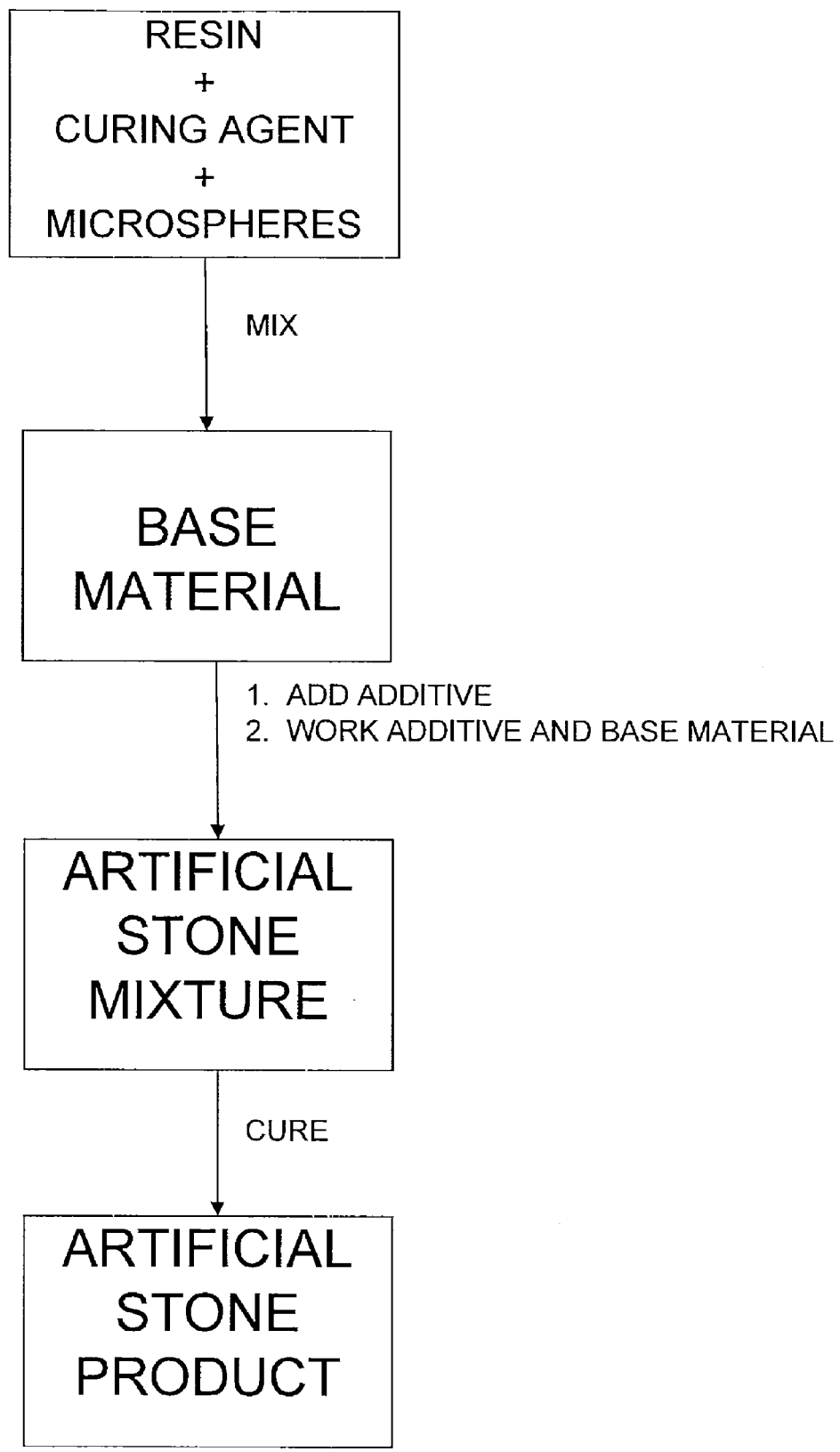

| | | | |
|---|---|---|---|
| 5,889,125 A * | 3/1999 | Neumann et al. | 525/504 |
| 5,902,755 A * | 5/1999 | Driggett et al. | 442/172 |
| 5,959,002 A * | 9/1999 | Kuramochi et al. | 523/176 |
| 6,015,519 A * | 1/2000 | Lapikas et al. | 264/74 |
| 6,025,052 A * | 2/2000 | Maurer et al. | 428/141 |
| 6,054,080 A * | 4/2000 | Sheahan et al. | 264/71 |
| 6,056,904 A * | 5/2000 | Wiener | 264/77 |
| 6,160,041 A * | 12/2000 | Neuner | 523/440 |
| 6,174,977 B1 * | 1/2001 | Ariyoshi et al. | 526/194 |
| 6,194,051 B1 * | 2/2001 | Gagas et al. | 428/99 |
| 6,221,300 B1 * | 4/2001 | Sakai | 264/322 |
| 6,306,321 B1 * | 10/2001 | Mukai et al. | 264/73 |
| 6,309,562 B1 * | 10/2001 | Sakai et al. | 252/301.36 |
| 6,365,662 B1 * | 4/2002 | Sakai et al. | 524/494 |
| 6,387,304 B2 * | 5/2002 | Mukai et al. | 264/73 |
| 6,387,504 B1 * | 5/2002 | Mushovic | 428/413 |
| 6,475,631 B1 * | 11/2002 | Yamamoto et al. | 428/480 |
| 6,521,703 B2 * | 2/2003 | Zarnoch et al. | 525/17 |
| 6,531,222 B1 * | 3/2003 | Tanaka et al. | 428/402 |
| 6,548,157 B2 * | 4/2003 | Ghahary | 428/319.3 |
| 6,593,391 B2 * | 7/2003 | Teutsch et al. | 522/81 |
| 6,620,487 B1 * | 9/2003 | Tonyan et al. | 428/192 |
| 6,627,315 B2 * | 9/2003 | Sakai | 428/406 |
| 6,747,075 B2 * | 6/2004 | Nardi et al. | 523/218 |
| 6,790,393 B1 * | 9/2004 | Kraker | 264/71 |
| 6,989,424 B2 * | 1/2006 | Hettich et al. | 525/387 |
| 7,175,790 B2 * | 2/2007 | Emadipour et al. | 264/115 |
| 7,198,833 B1 * | 4/2007 | West | 428/15 |
| 2001/0043996 A1 * | 11/2001 | Yamada et al. | 428/34.4 |
| 2002/0004111 A1 * | 1/2002 | Matsubara et al. | 428/34.4 |
| 2002/0086140 A1 * | 7/2002 | Ghahary | 428/143 |
| 2002/0169236 A1 * | 11/2002 | Halterman et al. | 523/218 |
| 2003/0232909 A1 * | 12/2003 | Hettich et al. | 524/243 |

* cited by examiner

METHOD OF MANUFACTURING AN ARTIFICIAL STONE MATERIAL

CROSS REFERENCE TO RELATED APPLICATIONS

This application is a continuation-in-part of U.S. application Ser. No. 10/611,581, filed Jul. 1, 2003, the contents of which are incorporated in their entirety.

FIELD

This disclosure relates generally to a manmade material having an improved stone like appearance and comprising polymers. The artificial stone material can have a density of less than 1 g/cc.

BACKGROUND

Stone is considered a very desirable building material for its aesthetics. However, despite the desirable appeal of natural stone its use is limited by certain of its properties. In particular, natural stones are very dense, hard and have high specific gravity. Thus, stone materials are difficult to fabricate, difficult to use other than by the traditional lay up methods and require substantial structures to support the weight of the stone fabrication. Some properties for natural stone materials are summarized in Table 1 below:

TABLE 1

| material | specific gravity | density (lb/ft$^3$) |
| --- | --- | --- |
| bluestone | 2.5-2.6 | 159 |
| granite | 2.6-2.7 | 165 |
| marble | 2.6-2.9 | 170 |
| sandstone | 2.0-2.6 | 143 |
| slate | 2.6-2.9 | 172 |
| cement[1] | 1.5-2.4 | 100-144 |

[1]The specific gravity and density of cement materials will depend on the filler materials used.

In an effort to maintain the aesthetics appeal of natural stone products while overcoming some of their problems, various polymer-based solid surface materials have been produced. One example of such solid surface material is CORIAN, available from DuPont de NEMOURS and Company. These solid surface materials are easier to fabricate than natural stone products. Unfortunately, solid surface materials are readily distinguishable from natural stone products, as the appearance of known solid surface products can be described as a speckled solid color that does not closely approximate the more complicated look and texture of natural stone. Further, most solid surface products exhibit specific gravities of 1.7 to 1.8. Thus, considerable support is still required for structures fabricated from such high density solid surface products.

High density solid surface products are also difficult to manufacture. Typically, such products require considerable mixing and careful removal of all air from the mixture after the components are mixed and prior to casting or forming the solid surface product. Naturally, this makes manufacture of the high density solid surface products themselves, as opposed to manufacture of an article from a previously fabricated high density solid surface product, difficult outside of a fairly sophisticated manufacturing facility.

Engineered stone is an attempt to provide man-made materials that are more reminiscent of natural stone than solid surface materials. Engineered stone typically comprises substantial amounts of natural stone filler combined with a small amount of binder. The binder may be a polymer resin or cement. Engineered stone achieves a more "natural" look than solid surface materials but still falls short of the complicated look and texture of natural stone. However, engineered stone is a high density material with typical densities running over 2 grams per cubic centimeter (g/cc). Additionally, engineered stone precursors such as slabs or sheets are manufactured using sophisticated processes. Such engineered stone products are not suitable for manufacture from raw materials at an installation site. Further, engineered stone products retain the hardness of natural stone, making cutting, drilling and forming of the engineered stone products difficult without specialized tools and procedures.

Thus, there is a demand for an artificial stone product having the appearance and texture of natural stone. There is a demand for an artificial stone product that can be prepared at a point of use. There is a demand for a low density, artificial stone product that can be mounted to conventional surfaces using common mechanical fasteners or adhesives.

SUMMARY

Briefly stated, one embodiment of the disclosure comprises a manmade artificial stone material having the look of some types of natural stone. In some especially advantageous embodiments, the artificial stone material in cured form has a density of one gram per cubic centimeter or less and a specific gravity of one or less. Thus, these artificial stone material embodiments are considerably lighter and less dense than known solid surface or engineered stone materials while providing an appreciably improved natural stone appearance.

The synthetic stone product comprises a thermoset resin, a curing agent, microspheres and additives for color and texture. In one advantageous embodiment, the thermoset resin is a polyester resin and the curing agent is methyl ethyl ketone peroxide.

The additives comprise at least one of dry temper color, dry mortar, dye, pigment, paint, ash, glass, mica and stone dust. Aluminum trihydrate can be added to improve fire resistance. Milled fibers can be added to improve strength. The ingredients, amounts and particle sizes will vary depending on the color and texture desired.

In one embodiment resin, curing agent and microspheres are combined and mixed to form a catalyzed base material comprising a generally homogeneous mixture of resin, curing agent and microspheres having a desired viscosity. The order of combining the resin, curing agent and microspheres is not limited and can be varied to suit the application. For example, the resin, curing agent and microspheres can be combined and mixed at a point of use. Alternatively, the microspheres can be combined with either or both of the resin and curing agent to form premixes. These premixes can be combined as needed and where needed to form the catalyzed base material comprising a generally homogeneous mixture of resin, curing agent and microspheres having a desired viscosity. Since the catalyzed base material can be prepared in almost any location the artificial stone made using the catalyzed base material can be prepared and cured at the point of use, something not possible with solid surface and engineered stone products. In an advantageous embodiment, a predetermined amount of thermoset resin and a predetermined amount of curing agent are combined and mixed. After thorough mixing the microspheres are added and mixed with the resin/curing agent mixture at a slow rate and with minimal agitation to a required viscosity. The slow mixing rate and minimal agitation minimize microsphere breakage. Once a desired viscosity is obtained, the additives are non-homogeneously "worked" into the catalyzed base material to form a catalyzed stone mixture.

The catalyzed stone mixture can be molded into a suitable shape. The cured item when removed from the mold will have a very realistic natural stone appearance and is ready for use without further work or modification. Alternatively, the catalyzed stone mixture can be applied to, or sculpted on, a surface, such as a wall, to provide that surface with a realistic stone appearance. Since the artificial stone material can have a low density, the surface will not typically require special structures to support the artificial stone facade. Artificial stones produced from the disclosed composition can be readily cut and drilled with ordinary woodworking tools. Additionally, artificial stones produced from the disclosed composition can be readily fastened to horizontal or vertical surfaces such as walls, using common mechanical fasteners such as brads or nails without requiring predrilling of the artificial stones. The disclosed artificial stones can also be applied to surfaces using adhesives.

In general, the disclosed compositions and methods may be alternately formulated to comprise, consist of, or consist essentially of, any appropriate components or steps herein disclosed. The disclosed compositions and methods may additionally, or alternatively, be formulated so as to be devoid, or substantially free, of any components, materials, ingredients, adjuvants, species or steps used in prior art compositions or that are otherwise not necessary to the achievement of the disclosed function.

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

DETAILED DESCRIPTION

The disclosed artificial stone materials are produced from a composition comprising a thermoset resin, a curing agent, microspheres, and additives. The thermoset resins that are useful include, for example, polyester resins including isophthalate, orthophthalate and terephthalate polyester resins, polyethylene terephthalate resin, dicyclopentadiene resins (DCPD), vinyl ester resins and bisphenol resins. The thermoset resin is advantageously a polyester resin. The curing agent used in the disclosed artificial stone composition is selected from materials that can initiate cross-linking of the chosen thermoset resin. Thus, polyester resins will typically use methyl ethyl ketone peroxide as a curing agent while bisphenol resins will typically use an amine based curing agent. The amount of curing agent used is dependent on the amount of thermoset resin used in the composition. For some thermoset resins such as polyester resins, the amount of curing agent used may be varied to increase or decrease the cure time of the catalyzed base material.

Microspheres comprise a very thin shell surrounding a hollow core. Typically, a microsphere is spherical. The shell may be comprised of various materials such as for example, glass, silica, polymers, ceramics and alumina. Microspheres typically have a particle size range of about 5 to about 400 microns. Because the microspheres have a very thin shell surrounding a relatively large volume, they have a very low effective density that can be 0.2 g/cc or less. Some microsphere products include EXPANCEL products available from Nobel Industries, Q-CEL products available from the PQ Corporation, PM hollow sphere products available from the PQ Corporation and EXTENDOSPHERES products available from the PQ Corporation.

The additives are used to provide the disclosed artificial stone product with an appearance closely approximating natural stone. In general, the additives can comprise one or more of dry temper colors, dry mortar, dyes, pigments, paint, wood ash, mica, stone particles and glass particles. Preparation of the artificial stone material starts with providing predetermined amounts of resin, curing agent and microspheres. The amount of curing agent is based on the type of thermoset resin chosen and the desired cure time. The amount of microspheres is typically in the range of about 8% to about 63% by weight of the resin. In advantageous variations the amount of microspheres is typically in the range of about 20% to about 55% by weight of the resin. In other advantageous variations the amount of microspheres is typically in the range of about 30% to about 45% by weight of the resin. The amounts of resin, curing agent and microspheres are chosen so that the resulting homogeneous mixture will have a suitable viscosity to form a catalyzed base material. Experience has shown that a catalyzed base material having a viscosity that is too low is not able to achieve a suitable natural stone appearance. This is due to the fact that a low viscosity material is too fluid, is difficult to work and tends to more completely homogenize subsequently added additives resulting in an unnatural appearance. A catalyzed base material having a viscosity that is too high tends to provide a catalyzed stone mixture which crumbles, is difficult to mix with additives and is difficult or impossible to form into an artificial stone surface. With some experience, a suitable catalyzed base material viscosity can be achieved by workers at the point of use without the need for measuring equipment.

In some embodiments a viscosity of about $950 \times 10^6$ to about $1590 \times 10^6$ cps (HB viscometer available from Brookfield Engineering of Middleboro, Mass., TE spindle, 1 rpm, factor 40 mm) may be suitable. As a comparison, some known polymer materials have the following viscosities:

| | |
|---|---|
| polymer based solid surface catalyzed mixtures | about 360,000 cps |
| polyester resin based auto body filler | about 590,000 to 700,000 cps |
| polyester based fairing compound | about 600,000 to 900,000 cps |

The order of mixing the resin, curing agent and microspheres to form a catalyzed base mixture can be varied depending on application. For example, the microspheres can be added to the resin and mixed at a first location to form a microsphere/resin premix. The premix can be shipped to a second location and mixed with the curing agent to form a catalyzed base material. Alternatively, the microspheres can be added to the curing agent and mixed at a first location to form a microsphere/curing agent premix. The microsphere/curing agent premix can be shipped to a second location and mixed with the resin to form a catalyzed base material. Or, some portion of the microsphere amount can be mixed with the resin and the remainder of the microsphere amount can be mixed with the curing agent at a first location to form two premixes. The premixes can be shipped to a second location and mixed to form a catalyzed base material. Naturally, the resin, curing agent and microspheres can be combined and mixed at a single location to form a catalyzed base material. Mixtures comprising microspheres are advantageously mixed slowly to blend the microspheres into the mixture while minimizing breakage of the microspheres. Mixing speed can be increased if the amount of microspheres added is also increased to account for breakage. Commercially available paddle mixers have been found suitable for mixing the catalyzed base material. Advantageously, the microspheres are homogeneously distributed in the catalyzed base material. As used herein a homogeneous distribution need not be mathematically precise but may be a generally homogeneous distribution as allowed by the selected mixing method. There is no need to eliminate air entrainment during mixing.

In one embodiment, an artificial stone material can advantageously be prepared directly at the point of use. Preparation of the artificial stone material starts with adding the curing agent to the thermoset resin. The amount of thermoset resin used is determined by the amount of product needed. The amount of curing agent needed is based on the type of thermoset resin chosen and the desired cure time. This catalyzed resin mixture is thoroughly mixed by any suitable method. There is no need to eliminate air entrainment from this mixture. Microspheres are added by pouring directly over the top of the catalyzed resin mixture with generally homogeneous mixing to form the catalyzed base material.

The catalyzed base material is placed in a mixing container of suitable size. One or more of the additives are sprinkled over the catalyzed base material. Subsequently, the catalyzed base material and additives are "worked" or "lightly mixed" to incorporate the additives into the catalyzed base material to form the stone patterning. One method of working is to roll one or more of the additives onto the catalyzed base material. After rolling, pieces of catalyzed base material and additive are broken off and recombined onto other portions of the catalyzed base material. This breaking off and recombining process is repeated until the desired stone effect is achieved. Another working method that may be used separately or in addition to the above method is rolling the catalyzed base material in one or more of the additives and folding the rolled catalyzed base material/additives. The rolling and folding process is repeated until the desired stone effect is achieved. The additives may be added sequentially or all at once during working depending on the stone effect desired. This working or mixing step is surprisingly important and deviations from the disclosed procedure, even with the disclosed materials, may result in materials having an unsatisfactory appearance. It should be understood that the intent of this mixing step is to provide the catalyzed base material with spaced veins or layers of the additives and additive mixtures, thereby providing the look of a natural stone product. To this end, it is important that the additives are not smeared or homogenized completely into the catalyzed base mixture. For this reason, an acceptable natural stone product cannot be achieved if the catalyzed base material and additives are homogeneously mixed, for example using conventional methods such as stirring, shaking, paddle mixer, rotary mixer or cement mixer.

The catalyzed stone mixture can be packed into a flexible mold. After curing, the mold is removed to provide an artificial stone material closely approximating the look and texture of a natural stone. Alternatively, the catalyzed stone mixture can be transferred to a surface and sculpted. Typically sculpting is done by hand due to the high viscosity of the catalyzed stone mixture. Appropriate tools such as spatulas, knives, etc. may also be used. After curing, the sculpted surface of the artificial stone material approximates the look and texture of a natural stone surface.

It should be appreciated that most solid surface products and engineered stone products must be manufactured at a centralized location under controlled conditions using specialized equipment and transported in a cured state to an installation site. Once at the installation site these products are fabricated in the cured state and installed onto a working surface such as a wall or countertop. The disclosed artificial stone material is quite different in that some of the component materials can be premixed at a first location and the remainder of the component materials can be mixed with the premix at the point of use. The point of use may be hundreds or thousands of miles from the first location. Naturally, the component materials can also be mixed at the point of use. The catalyzed artificial stone mixture can be applied to a desired working surface at the point of use before curing. This allows the installer flexibility in fabrication and installation that is not possible with known materials.

Another advantage of some embodiments of the disclosed artificial stone material is the ability to attach or fasten the cured artificial stones directly to an existing wall. The cured artificial stones, while having a very realistic appearance, are considerably softer and lighter than either natural stone or other engineered stone or solid surface products. For this reason, common fasteners such as brads, nails and screws can be used to attach the cured artificial stones to many existing surfaces without the need for predrilling of the stones and without the need for support structures. The cured artificial stones can also be attached to existing surfaces using common adhesives.

In some advantageous embodiments, the catalyzed stone mixture has veins of additives worked throughout its extent. Thus, these artificial stone materials will have a natural stone appearance throughout their extent and do not require surface coatings to achieve this appearance. These artificial stone materials can be cut using common woodworking tools or PVC cutters and the cut surfaces will retain some or all of the natural stone appearance. The cut surfaces can be retextured by chipping pieces off using a knife-edge.

It should be understood that the following examples are included for purposes of illustration so that the disclosure may be more readily understood and are in no way intended to limit the scope of the disclosure unless otherwise specifically indicated.

EXAMPLE 1 grey field stone

| | | |
|---|---|---|
| resin | orthophthalate waxed resin[1] | 3 gallons |
| curing agent | methyl ethyl ketone peroxide[2] | 1% to 3% by resin volume |
| microspheres | Q-CEL 6019[3] | 28% to 39% by resin weight |
| additive | 92h iron black temper color[4] | 10 tablespoons |
| additive | 10h light buff temper color[5] | 4 tablespoons |
| additive | wood ash[6] | 6 cups |
| additive | glass particles[7] | as needed |

[1]available from AOC of Quebec, Canada.
[2]available from any commercial source as a 9% to 30% active peroxide mixture.
[3]available from Kish of Pennsylvania.
[4]available from Soloman Colors of Chicago.
[5]available from Soloman Colors of Chicago.
[6]available from commercial suppliers.
[7]available as, for example, DIAMOND DUST from masonry suppliers.

The resin is placed in a mixing tub and the curing agent is added and thoroughly stirred into the resin. Typically, about 60 cc of curing agent will provide about 1 to about 1.5 hours of working time before curing.

The catalyzed resin is placed in a paddle mixer and the microspheres are added. The mixture is mixed slowly to thoroughly blend the microspheres into the catalyzed mixture while minimizing breakage of the microspheres to form the catalyzed base material. When the desired viscosity is achieved, the mixing is stopped. The catalyzed base material will have a white or slightly off-white color throughout its extent.

The catalyzed base material is placed in a suitable mixing container such as a mortar tub. The wood ash is sprinkled over the base material and the mixture is rolled and worked by breaking off and recombining pieces of the catalyzed base material and additives. This process is repeated until the desired stone effect is achieved. Next the iron black and subsequently the light buff is added while working continues. The mixing provides random veins and swirls of the wood ash, iron black and buff additives in a matrix of white base material. The working is continued until the catalyzed stone mixture has the desired natural stone appearance. It is important that the additives are not overmixed into the catalyzed base material. A desirable natural stone appearance is not possible if the additives are homogeneously dispersed into the catalyzed base material. After mixing, the low density catalyzed stone mixture is ready to be molded or sculpted.

EXAMPLE 2

Red-brown sandstone

| | | |
|---|---|---|
| resin | modar 7607[1] | 3 gallons |
| curing agent | methyl ethyl ketone peroxide[2] | 9% to 30% by resin volume |
| fire retardant | aluminum trihydrate (ATH)[3] | 2 cups |
| microspheres | K20 Scotchlite glass bubbles[4] | 33% to 40% by resin weight |
| additive | 92h iron black temper color[5] | 1 tablespoon |
| additive | 10h light buff temper color[6] | 8 tablespoons |
| additive | wood ash (brown color)[7] | 6 cups |
| additive | glass particles[8] | as needed |

[1]fire retardant resin available from Reichold of Raleigh, North Carolina.
[2]available from any commercial source as a 9% to 30% active peroxide mixture.
[3]available from commercial suppliers.
[4]available from 3M of Minnesota.
[5]available from Soloman Colors of Chicago.
[6]available from Soloman Colors of Chicago.
[7]available from commercial suppliers.
[8]available as, for example, DIAMOND DUST from masonry suppliers.

The material of EXAMPLE 2 is a class 1 fire retardant material.

The resin is placed in a mixing tub and the curing agent is added and thoroughly stirred into the resin. Typically, about 60 cc of curing agent will provide about 1 to about 1.5 hours of working time before curing.

The catalyzed resin is placed in a paddle mixer and the microspheres are added. The mixture is mixed slowly to thoroughly blend the microspheres into the catalyzed mixture while minimizing breakage of the microspheres to form a catalyzed base material. When the desired viscosity is achieved, the mixing is stopped. The catalyzed base material will have a white or slightly off-white color throughout its extent.

The catalyzed base material is placed in a suitable mixing container such as a mortar tub. The wood ash is sprinkled over the base material and the mixture is rolled and worked by breaking off and recombining pieces of the catalyzed base material and additives. This process is repeated until the desired stone effect is achieved. Next the iron black and subsequently the light buff and other additives are added while working continues. The mixing provides random veins and swirls of the wood ash, iron black and buff additives in a matrix of white base material. The working is continued until the catalyzed stone mixture has the desired natural stone appearance. It is important that the additives are not overmixed into the catalyzed base material. A desirable natural stone appearance is not possible if the additives are homogeneously dispersed into the catalyzed base material. After mixing, the low density catalyzed stone mixture is ready to be molded or sculpted.

EXAMPLE 3 brown ledge stone

| | | |
|---|---|---|
| resin | polylite 3402-00 resin[1] | 3 gallons |
| curing agent | methyl ethyl ketone peroxide[2] | 1% to 3% by resin volume |
| microspheres | K19 Scotchlite glass bubbles[3] | 22% to 38% by resin weight |
| additive | 92h iron black temper color[4] | 1 tablespoon |
| additive | 10h light buff temper color[5] | 2 tablespoons |
| additive | wood ash (brown color)[6] | 6-8 cups |
| additive | mica[7] | 1 teaspoon |
| additive | stonedust (crushed stone)[8] | 1 tablespoon |

[1]available from Reichold of Raleigh, North Carolina.
[2]available from any commercial source as a 9% to 30% active peroxide mixture.
[3]available from 3M of Minnesota.
[4]available from Soloman Colors of Chicago.
[5]available from Soloman Colors of Chicago.
[6]available from commercial suppliers.
[7]available from commercial suppliers.
[8]available from commercial suppliers.

The resin is placed in a mixing tub and the curing agent is added and thoroughly stirred into the resin. Typically, about 60 cc of curing agent will provide about 1 to about 1.5 hours of working time before curing.

The catalyzed resin is placed in a paddle mixer and the microspheres are added. The mixture is mixed slowly to thoroughly blend the microspheres into the catalyzed mixture while minimizing breakage of the microspheres to form a catalyzed base material. When the desired viscosity is achieved, the mixing is stopped. The catalyzed base material will have a white or slightly off-white color throughout its extent.

The catalyzed base material is placed in a suitable mixing container such as a mortar tub. The wood ash is sprinkled over the base material and the mixture is rolled and worked by breaking off and recombining pieces of the catalyzed base material and additives. This process is repeated until the desired stone effect is achieved. Next the iron black and subsequently the light buff is added while working continues. The remaining additives are added after the light buff. The mixing provides random veins and swirls of the wood ash, iron black, buff and other additives in a matrix of white base material. The working is continued until the catalyzed stone mixture has the desired natural stone appearance. It is important that the additives are not overmixed into the catalyzed base material. A desirable natural stone appearance is not possible if the additives are homogeneously dispersed into the catalyzed base material. After mixing, the low density catalyzed stone mixture is ready to be molded or sculpted.

EXAMPLE 4 grey stacked stone

| | | |
|---|---|---|
| resin | corebatch AB-017W0[1] | 3 gallons |
| curing agent | methyl ethyl ketone peroxide[2] | 1% to 3% by resin volume |
| microspheres | Q-CEL 300s[3] | 22% to 38% by resin weight |
| fire retardant | aluminum trihydrate (ATH)[4] | 2 cups |
| additive | talc[5] | 4 tablespoons |
| additive | 92h iron black temper color[6] | 10 tablespoon |
| additive | 10h light buff temper color[7] | 4 tablespoons |
| additive | wood ash[8] | 6-8 cups |

EXAMPLE 4-continued grey stacked stone

| additive | glass particles[9] | as needed |
|---|---|---|
| additive | mica[10] | 2 teaspoons |
| additive | milled fibers[11] | as needed for strength |

[1]available from Reichold of Raleigh, North Carolina.
[2]available from any commercial source as a 9% to 30% active peroxide mixture.
[3]available from the PQ Corporation of Pennsylvania.
[4]available from commercial suppliers.
[5]available from commercial suppliers.
[6]available from Soloman Colors of Chicago.
[7]available from Soloman Colors of Chicago.
[8]available from commercial suppliers.
[9]available as, for example, DIAMOND DUST from masonry suppliers.
[10]available from commercial suppliers.
[11]available from commercial suppliers.

The resin is placed in a mixing tub and the curing agent is added and thoroughly stirred into the resin. Typically, about 60 cc of curing agent will provide about 1 to about 1.5 hours of working time before curing.

The catalyzed resin is placed in a paddle mixer and the microspheres are added. The mixture is mixed slowly to thoroughly blend the microspheres into the catalyzed mixture while minimizing breakage of the microspheres to form a catalyzed base material. When the desired viscosity is achieved, the mixing is stopped. The catalyzed base material will have a white or slightly off-white color throughout its extent.

The catalyzed base material is placed in a suitable mixing container such as a mortar tub. The wood ash is sprinkled over the base material and the mixture is rolled and worked by breaking off and recombining pieces of the catalyzed base material and additives. This process is repeated until the desired stone effect is achieved. Next the iron black and subsequently the light buff is added while working continues. The remaining additives are added after the light buff. The mixing provides random veins and swirls of the wood ash, iron black, buff and other additives in a matrix of white base material. The working is continued until the catalyzed stone mixture has the desired natural stone appearance. It is important that the additives are not overmixed into the catalyzed base material. A desirable natural stone appearance is not possible if the additives are homogeneously dispersed into the catalyzed base material. After mixing, the low density catalyzed stone mixture is ready to be molded or sculpted.

EXAMPLE 5

| resin | orthophtalate waxed resin[1] | 2 gallons |
|---|---|---|
| curing agent | methyl ethyl ketone peroxide[2] | 60 ml |
| microspheres | Q-CEL 6019[3] | 8% by resin weight |
| additive | 92h iron black temper color[4] | about 1.5 tablespoons |
| additive | 10h light buff temper color[5] | about 4 teaspoons |
| additive | wood ash[6] | 5 to 6 cups |
| additive | mica[7] | about 3 teaspoons |

[1]available from AOC of Quebec, Canada.
[2]available from any commercial source as a 9% to 30% active peroxide mixture.
[3]available from PQ Corporation.
[4]available from Soloman Colors of Chicago.
[5]available from Soloman Colors of Chicago.
[6]available from commercial suppliers.
[7]available from Kish Co. of Pennsylvania.

The resin is placed in a mixing tub. The microspheres are homogeneously mixed into the resin to form a premix. Mixing of the microspheres is done slowly to thoroughly blend the microspheres into the resin while minimizing breakage of the microspheres. The resin/microsphere mixture will have a blue or pink color due to resin pigment.

The curing agent is added and mixed into the premix to form a catalyzed base material. Typically, about 60 cc of curing agent will provide about 1 to about 1.5 hours of working time before curing. The resin pigment will typically turn white to indicate the resin has started to cure. Addition of curing agent to the premix can be done at any convenient location and at any convenient time when curing of the premix is desired.

The catalyzed base material is placed in a suitable mixing container such as a mortar tub. The wood ash is sprinkled over the base material and the mixture is rolled and worked by breaking off and recombining pieces of the catalyzed base material and additives. This working process is repeated until the desired stone effect is achieved. Next the iron black and the light buff are separately added and worked into the mixture. The working provides random veins and swirls of the wood ash, iron black and buff additives in a matrix of white base material. The working is continued until the catalyzed stone mixture has the desired natural stone appearance. It is important that the additives are not overmixed into the catalyzed base material. A desirable natural stone appearance is not possible if the additives are homogeneously dispersed into the catalyzed base material. It should be noted that use of 8 percent microspheres provided a catalyzed base material with a relatively low viscosity. Working of the additives into this low viscosity catalyzed base material has to be done carefully to avoid overmixing, homogeneous distribution of additives and loss of the desired natural stone appearance. After mixing, the catalyzed stone mixture is ready to be molded or sculpted.

EXAMPLE 6

| resin | orthophtalate waxed resin[1] | 2 gallons |
|---|---|---|
| curing agent | methyl ethyl ketone peroxide[2] | 60 ml |
| microspheres | Q-CEL 6019[3] | 20% by resin weight |
| additive | 92h iron black temper color[4] | about 1.5 tablespoons |
| additive | 10h light buff temper color[5] | about 4 teaspoons |
| additive | wood ash[6] | 5 to 6 cups |
| additive | mica[7] | about 3 teaspoons |

[1]available from AOC of Quebec, Canada.
[2]available from any commercial source as a 9% to 30% active peroxide mixture.
[3]available from PQ Corporation.
[4]available from Soloman Colors of Chicago.
[5]available from Soloman Colors of Chicago.
[6]available from commercial suppliers.
[7]available from Kish Co. of Pennsylvania.

The resin is placed in a mixing tub. The microspheres are homogeneously mixed into the resin to form a premix. Mixing of the microspheres is done slowly to thoroughly blend the microspheres into the resin while minimizing breakage of the microspheres. The resin/microsphere mixture will have a blue or pink color due to resin pigment.

The curing agent is added and mixed into the premix to form a catalyzed base material. Typically, about 60 cc of curing agent will provide about 1 to about 1.5 hours of working time before curing. The resin pigment will typically turn white to indicate the resin has started to cure. Addition of curing agent to the premix can be done at any convenient location and at any convenient time when curing of the premix is desired.

The catalyzed base material is placed in a suitable mixing container such as a mortar tub. The wood ash is sprinkled over the base material and the mixture is rolled and worked by breaking off and recombining pieces of the catalyzed base material and additives. This working process is repeated until the desired stone effect is achieved. Next the iron black and the light buff are separately added and worked into the mixture. The working provides random veins and swirls of the wood ash, iron black and buff additives in a matrix of white base material. The working is continued until the catalyzed stone mixture has the desired natural stone appearance. It is important that the additives are not overmixed into the catalyzed base material. A desirable natural stone appearance is not possible if the additives are homogeneously dispersed into the catalyzed base material. After mixing, the catalyzed stone mixture is ready to be molded or sculpted.

EXAMPLE 7

| resin | orthophthalate waxed resin[1] | 2 gallons |
|---|---|---|
| curing agent | methyl ethyl ketone peroxide[2] | 60 ml |
| microspheres | Q-CEL 6019[3] | 30% by resin weight |
| additive | 92h iron black temper color[4] | about 1.5 tablespoons |
| additive | 10h light buff temper color[5] | about 4 teaspoons |
| additive | wood ash[6] | 5 to 6 cups |
| additive | mica[7] | about 3 teaspoons |

[1]available from AOC of Quebec, Canada.
[2]available from any commercial source as a 9% to 30% active peroxide mixture.
[3]available from PQ Corporation.
[4]available from Soloman Colors of Chicago.
[5]available from Soloman Colors of Chicago.
[6]available from commercial suppliers.
[7]available from Kish Co. of Pennsylvania.

The resin is placed in a mixing tub. The microspheres are homogeneously mixed into the resin to form a premix. Mixing of the microspheres is done slowly to thoroughly blend the microspheres into the resin while minimizing breakage of the microspheres. The resin/microsphere mixture will have a blue or pink color due to resin pigment.

The curing agent is added and mixed into the premix to form a catalyzed base material. Typically, about 60 cc of curing agent will provide about 1 to about 1.5 hours of working time before curing. The resin pigment will typically turn white to indicate the resin has started to cure. Addition of curing agent to the premix can be done at any convenient location and at any convenient time when curing of the premix is desired.

The catalyzed base material is placed in a suitable mixing container such as a mortar tub. The wood ash is sprinkled over the base material and the mixture is rolled and worked by breaking off and recombining pieces of the catalyzed base material and additives. This working process is repeated until the desired stone effect is achieved. Next the iron black and the light buff are separately added and worked into the mixture. The working provides random veins and swirls of the wood ash, iron black and buff additives in a matrix of white base material. The working is continued until the catalyzed stone mixture has the desired natural stone appearance. It is important that the additives are not overmixed into the catalyzed base material. A desirable natural stone appearance is not possible if the additives are homogeneously dispersed into the catalyzed base material. After mixing, the catalyzed stone mixture is ready to be molded or sculpted.

While preferred embodiments of the foregoing disclosed have been set forth for purposes of illustration, the foregoing description should not be deemed a limitation of the disclosed herein. Accordingly, various modifications, adaptations and alternatives may occur to one skilled in the art without departing from the spirit and scope of the present disclosure.

What is claimed is:

1. A method of producing an artificial stone material, comprising the steps of:
  combining resin, curing agent and about 8 percent to about 63 percent (by combined weight of the resin and curing agent) of microspheres;
  mixing the resin, curing agent and microspheres to form a base material;
  adding an additive to the base material;
  working the additive and the base material to form an artificial stone mixture, wherein the additive is non-homogeneously distributed in the artificial stone mixture; and
  curing the artificial stone mixture to form an artificial stone product having the appearance of natural stone, wherein said base material has a viscosity within the range of approximately $950 \times 10^6$ to approximately $1590 \times 10^6$ centipoise prior to said step of adding an additive.

2. The method of claim 1 wherein the step of curing comprises curing the artificial stone mixture in a mold to form an artificial stone and further comprising the step of applying the artificial stone product to a working surface.

3. The method of claim 1 wherein the microspheres are homogeneously distributed in the base material.

4. The method of claim 1 wherein the artificial stone product has a specific gravity of less than 1.

5. The method of claim 1 further comprising the step of providing a working surface at a point of use, wherein the step of adding an additive to the base material is performed at the point of use.

6. The method of claim 1 further comprising the steps of providing a working surface at a point of use; applying the artificial stone mixture to the working surface and curing the artificial stone mixture on the working surface.

7. The method of claim 1 further comprising the step of combining at least some of the microspheres with one of the resin or curing agent at a first location to form a first premix and the step of combining comprises mixing resin or curing agent with the first premix at a second location removed from the first location.

8. The method of claim 1 wherein the steps of mixing and adding an additive to the base material are performed at a point of use and further comprising the step of sculpting the artificial stone mixture into a shape, wherein the shape is maintained while curing.

9. A method of producing an artificial stone facade comprising the sequential steps of:
  providing a working surface;
  combining curing agent, thermoset resin and about 8 percent to about 63 percent (by weight of curing agent and resin) of microspheres to form a catalyzed resin mixture;
  mixing the catalyzed resin mixture to form a base material having a viscosity within the range of approximately $950 \times 10^6$ to approximately $1590 \times 10^6$ centipoise;
  adding an additive to the catalyzed base material;
  lightly mixing the additive and the base material near the working surface by breaking and recombining the base material to form an artificial stone mixture, wherein the additives are non-homogeneously distributed so that the artificial stone mixture has the appearance of natural stone; and
  applying the artificial stone mixture to the working surface.

10. The method of claim 9 wherein the microspheres are homogeneously distributed in the base material.

11. The method of claim 9 further comprising the step of curing the artificial stone mixture in a mold to form an artificial stone and wherein the step of applying comprises applying the cured artificial stone to the working surface.

12. The method of claim 9 further comprising the step of curing the artificial stone mixture in a mold to form an artificial stone and wherein the step of applying comprises fastening the cured artificial stone to the working surface using a mechanical fastener.

13. The method of claim 9 further comprising the step of curing the artificial stone mixture in a mold to form an artificial stone and wherein the step of applying comprises fastening the cured artificial stone to the working surface using a mechanical fastener without first predrilling of the artificial stone.

14. The method of claim 9 further comprising the step of curing the artificial stone mixture while in contact with the working surface after the step of applying.

15. The method of claim 9 wherein the cured artificial stone mixture has a specific gravity of less than 1.

16. A method of forming a facade having the appearance of natural stone, comprising the sequential steps of:

mixing curing agent, thermoset resin and about 8 percent to about 63 percent (by weight of curing agent and resin) of microspheres to form a catalyzed resin mixture;

mixing the catalyzed resin mixture to form a base material;

adding an additive to the base material;

non-homogeneously mixing the additive to the base material by breaking and recombining pieces of said base material to form an artificial stone mixture;

curing the artificial stone mixture to form a plurality of artificial stone products having the appearance of natural stone;

choosing one artificial stone product; and securing the chosen artificial stone product to the working surface, wherein said base material has a viscosity within the range of approximately $950 \times 10^6$ to approximately $1590 \times 10^6$ centipoise prior to said step of mixing an additive to the base material.

17. The method of claim 16 wherein the microspheres are homogeneously distributed in the base material.

18. The method of claim 16 wherein the step of securing comprises mechanically fastening the chosen artificial stone product to the working surface.

19. The method of claim 16 wherein the step of securing comprises nailing the chosen artificial stone product to the working surface.

20. The method of claim 16 wherein the step of securing comprises adhering the chosen artificial stone product to the working surface.

\* \* \* \* \*